(12) United States Patent
VanBlon et al.

(10) Patent No.: US 8,830,194 B2
(45) Date of Patent: Sep. 9, 2014

(54) TOUCHSCREEN VIRTUAL TRACK CONTROL

(75) Inventors: Russell Speight VanBlon, Raleigh, NC (US); John Carl Mese, Cary, NC (US); Nathan J. Peterson, Durham, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 168 days.

(21) Appl. No.: 13/421,622

(22) Filed: Mar. 15, 2012

(65) Prior Publication Data

US 2013/0241828 A1    Sep. 19, 2013

(51) Int. Cl.
*G06F 3/041* (2006.01)

(52) U.S. Cl.
USPC .......................................... 345/173; 345/157

(58) Field of Classification Search
None
See application file for complete search history.

(56) References Cited

U.S. PATENT DOCUMENTS

| | | | |
|---|---|---|---|
| 6,278,443 B1 * | 8/2001 | Amro et al. | 345/173 |
| 2004/0196267 A1 * | 10/2004 | Kawai et al. | 345/173 |
| 2011/0285648 A1 * | 11/2011 | Simon | 345/173 |
| 2011/0320978 A1 * | 12/2011 | Horodezky et al. | 715/823 |

* cited by examiner

*Primary Examiner* — Jason Olson

(74) *Attorney, Agent, or Firm* — Kunzler Law Group

(57) ABSTRACT

For performing touchscreen virtual touch control, a display module displays a control interface in response to detecting a finger touch of a finger on a touchscreen. A detection module detects a finger roll of the finger on the touchscreen and performs an action in response to detecting the finger roll.

18 Claims, 9 Drawing Sheets

TOUCHSCREEN VIRTUAL TRACK CONTROL

BACKGROUND

1. Field

The subject matter disclosed herein relates to tracking control and more particularly relates to touchscreen virtual tracking control.

2. Description of the Related Art

Touchscreens allow electronic devices of all sizes to employ sophisticated Graphical User Interfaces (GUI). However, GUI icons may be too small to conveniently activate with a finger.

BRIEF SUMMARY

The embodiments of the present invention have been developed in response to the present state of the art, and in particular, in response to the problems and needs in the art that have not yet been fully solved by currently available touchscreen navigation methods. Accordingly, the embodiments have been developed to provide an apparatus, method, and program product for touchscreen virtual track control that overcome many or all of the shortcomings in the art.

The apparatus to provide touchscreen virtual track control includes a plurality of modules. These modules in the described embodiments include a storage device, a processor, a display module, and a detection module. The storage device stores machine-readable code. The processor executes the machine-readable code. The display module displays a control interface in response to detecting a finger touch of a finger on a touchscreen. The detection module detects a finger roll of the finger on the touchscreen and performs an action in response to detecting the finger roll.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
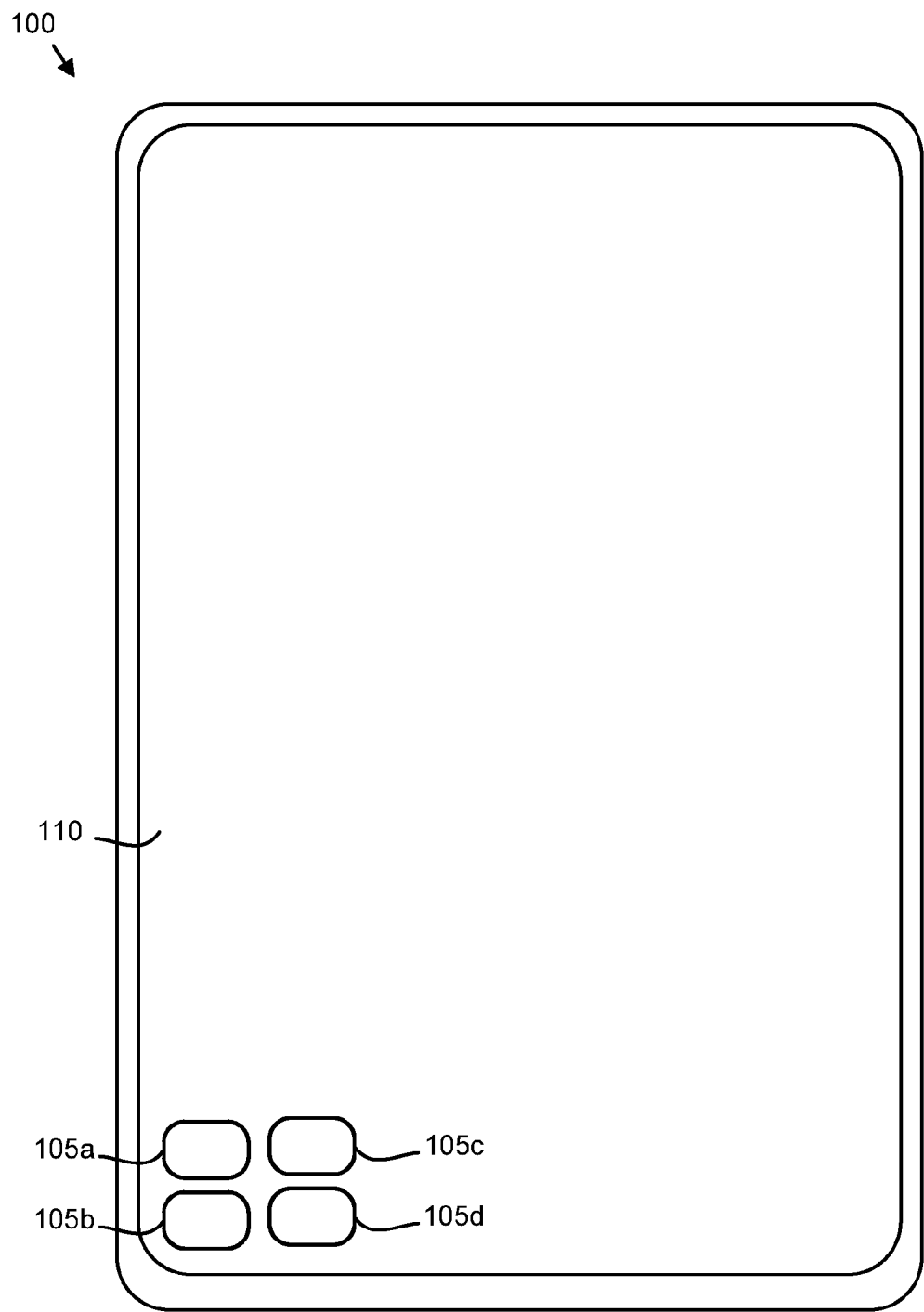
FIG. 1 is a front view drawing illustrating one embodiment of an electronic device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine-readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable code and/or software for execution by various types of processors. An identified module of machine-readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine-readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more storage devices.

Any combination of one or more machine-readable medium may be utilized. The machine-readable storage medium may be a machine-readable signal medium or a storage device. The machine-readable medium may be a storage device storing the machine-readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine-readable signal medium may include a propagated data signal with machine-readable code embodied therein, for example, in baseband or as part of a carrier wave. Such a propagated signal may take any of a variety of forms, including, but not limited to, electro-magnetic, optical, or any suitable combination thereof. A machine-readable signal medium may be any storage device that is not a computer readable storage medium and that can communicate, propagate, or transport a program for use by or in connection with an instruction execution system, apparatus, or device. Machine-readable code embodied on a storage device may be transmitted using any appropriate medium, including but not limited to wireless, wireline, optical fiber cable, Radio Frequency (RF), etc., or any suitable combination of the foregoing.

Machine-readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine-readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine-readable code. These machine-readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine-readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine-readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine-readable code. Descriptions of Figures may refer to elements described in previous Figures, like numbers referring to like elements.

FIG. 1 is a front view drawing illustrating one embodiment of an electronic device 100. The electronic device 100 may be a tablet computer, a cellular telephone, and the like. Alternatively, the electronic device 100 may be a detachable screen of a laptop computer, a computer workstation, a kiosk display, and the like. The electronic device 100 includes a touchscreen 110. The touchscreen 110 may display a Graphical User Interface (GUI). The GUI may include one or more icons 105. The touchscreen 110 may comprise a capacitive touch sensor, a resistive touch sensor, a surface acoustic wave sensor, an acoustic pulse sensor, an infrared touch sensor, an optical touch sensor, a dispersion signal touch sensor, and the like to detect and locate touches from a finger, stylus, and the like. For simplicity, all objects touching the touchscreen are referred to herein as fingers.

A user may initiate a command on the electronic device 100 by touching, swiping, and/or otherwise manually manipulating an icon 105 with a finger. However, when the icons 105 are small and/or closely grouped on the touchscreen 110, the user may have difficulty activating a desired icon 105. The embodiments described herein provide a touchscreen virtual track control that aids the user in activating an icon 105.

Figure 2:
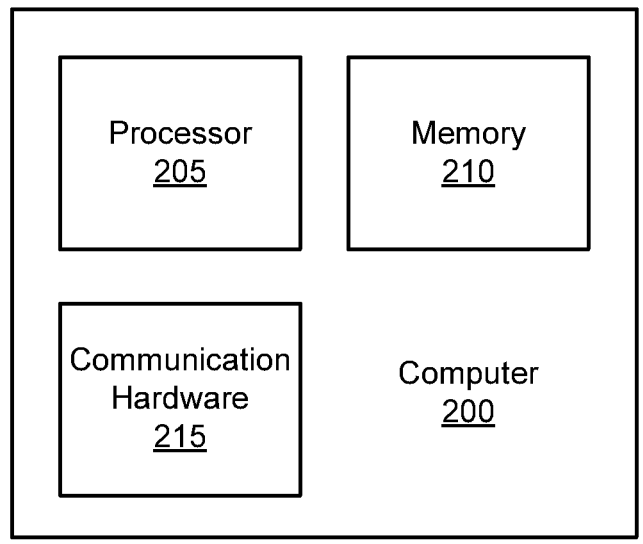
FIG. 2 is a schematic block diagram illustrating one embodiment of a computer.

FIG. 2 is a schematic block diagram illustrating one embodiment of a computer 200. The computer 200 may be embodied in the electronic device 100 of FIG. 1. Alternatively, the computer 200 may be in communication with the electronic device 100. In the depicted embodiment, the computer 200 includes a processor 205, a memory 210, and communication hardware 215. The memory 210 may store machine-readable code. The memory 210 may be a semiconductor storage device, a hard disk drive, an optical storage device, and/or combinations thereof. The processor 205 may execute the machine-readable code. The computer 200 may communicate with other devices through the communication hardware 215. For example, the computer 200 may control the touchscreen 110 through the communication hardware 215.

Figure 3:
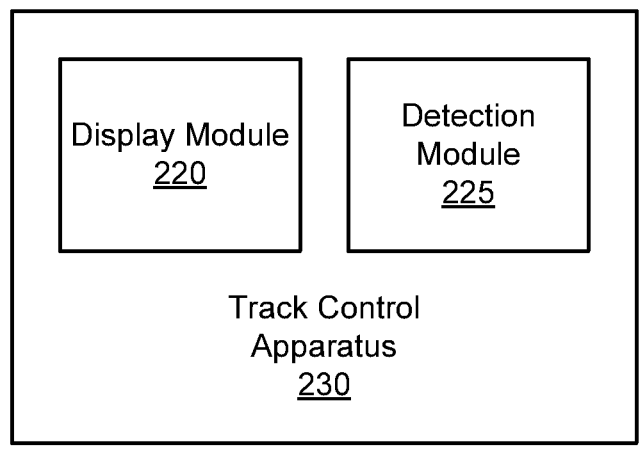
FIG. 3 is a schematic block diagram illustrating one embodiment of a track control apparatus.

FIG. 3 is a schematic block diagram illustrating one embodiment of a track control apparatus 230. The track control apparatus 230 may be embodied in the computer 200 of FIG. 2. In the depicted embodiment, the apparatus 230 includes a display module 220 and a detection module 225. In one embodiment, the display module 220 and a detection module 225 are embodied in machine-readable code. The machine-readable code may be stored on a storage device such as the memory 210. The processor 205 may execute the machine-readable code.

The display module 220 may display a control interface in response detecting a first finger touch of a finger on the touchscreen 110. The detection module 205 may detect a finger roll of the finger on the touchscreen 110 and perform an action in response to detecting the finger roll.

Figure 4A:
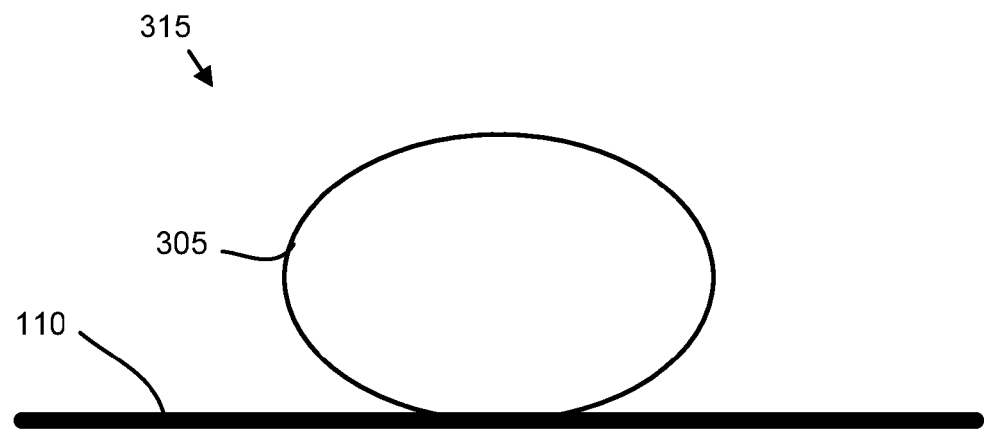
FIG. 4A is a front view drawing illustrating one embodiment of a finger on a touchscreen.

FIG. 4A is a front view drawing illustrating one embodiment of a finger touch 315 on a touchscreen 110. A finger 305 is depicted touching the touchscreen 110 as a finger touch 315. As the finger 305 touches the touchscreen 110, multiple portions of the finger 305 contact the touchscreen 110 while other portions of the finger 305 do not contact the touchscreen 110.

As used herein, the finger touch 315 may be distinguished from other contacts of the finger 305 to the touchscreen 110. For example, the finger touch 305 may be a contact holding the finger 305 on the touchscreen at a location for a minimum time interval of at least 800 milliseconds (ms). Alternatively, the finger touch 315 may be contact of the finger 305 for a minimum time interval longer than 1.5 seconds.

Figure 4B:
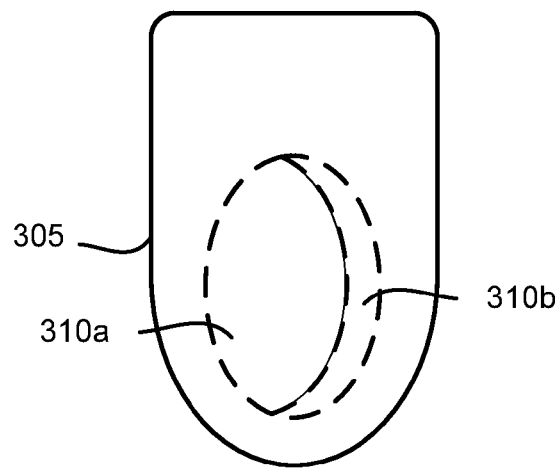
FIG. 4B is a bottom view drawing illustrating one embodiment of a finger on a touchscreen.

FIG. 4B is a bottom view drawing illustrating one embodiment of a finger 305. The finger 305 is the finger 305 of FIG. 4A. In the depicted embodiment, a first finger portion 310a of the finger 305 and a second finger portion 310b of the finger 305 contact the touchscreen 110.

Figure 5A:
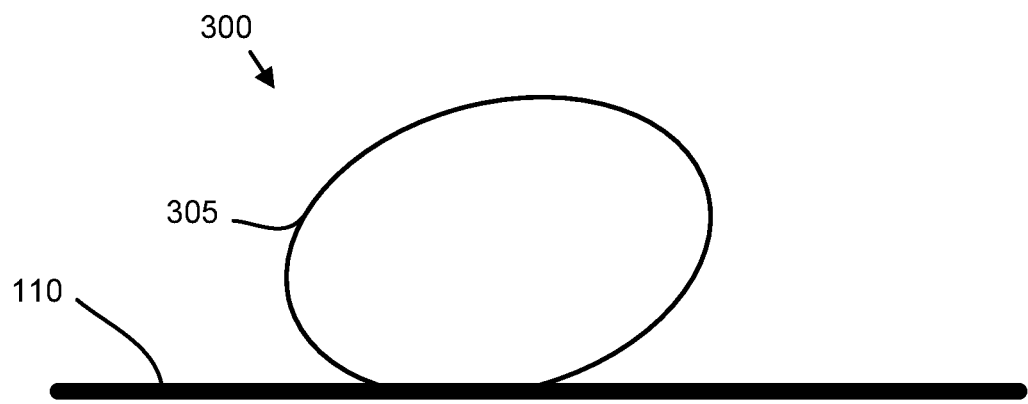
FIG. 5A is a front view drawing illustrating one embodiment of a finger roll on a touchscreen.
Figure 5B:
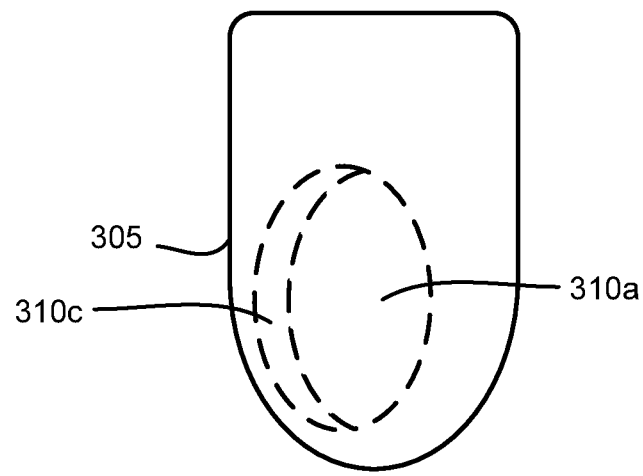
FIG. 5B is a bottom view drawing illustrating one embodiment of a finger roll.

FIG. 5A is a front view drawing illustrating one embodiment of the finger roll 300 on a touchscreen 110. The finger 305 of FIG. 4A is depicted as rolling to a side on the touchscreen 110. FIG. 5B is a bottom view drawing illustrating one embodiment of the finger roll 300. The first finger portion 310a remains in a first position relative to the touchscreen 110. The second finger portion 310b of the finger 305 changes relative to the touchscreen 110. In the depicted embodiment, the second finger portion 310b no longer contacts the touchscreen 110. A third finger portion 110c of the finger 305 contacts the touchpad 110 as a result of the finger roll 300.

The finger roll 300 may comprise a first finger position 310a remaining in a first position relative to the touchscreen 110 while a second finger portion 310b changes relative to the touchscreen 110. The change may be the second finger portion 310b newly contacting the touchscreen 110. Alternatively the change may be the second finger portion 310b no longer contacting the touchscreen 110.

Figure 6:
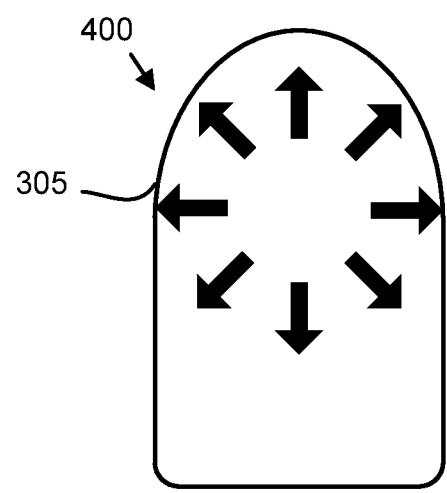
FIG. 6 is a bottom view drawing illustrating one embodiment of finger roll directions.

FIG. 6 is a bottom view drawing illustrating one embodiment of a finger roll directions 400. The finger 305 of FIGS. 4A, 4B, 5A, and 5B may be rolled in a plurality of directions 400. In one embodiment, the direction 400 is interpolated from a change in finger portions 310 of the finger 305 that are in contact with the touchscreen 110. For example, the finger roll 300 may have a direction 400 calculated as a vector running from finger portions 310 that are no longer in contact with the touchscreen 110 to finger portions 310 that are recently in contact with the touchscreen 110. For example, the Cartesian coordinates of vector v may be calculated using Equations 1 and 2, where $x_{an}$ is an x coordinate of each nth pixel of the touchscreen 110 in a portion 310 newly in contact with the touchscreen 310, $y_{an}$ is a y coordinate of each nth pixel in a portion 310 newly in contact with the touchscreen 310, $x_{bn}$ is an x coordinate of each nth pixel in a portion 310 no longer in contact with the touchscreen 310, and $y_{bn}$ is a y coordinate of each nth pixel in a portion 310 no longer in contact with the touchscreen 310.

$$v_x = (\Sigma x_{an} - \Sigma x_{bn})/n \quad \text{Equation 1}$$

$$v_y = (\Sigma y_{an} - \Sigma y_{bn})/n \quad \text{Equation 2}$$

Figure 7:
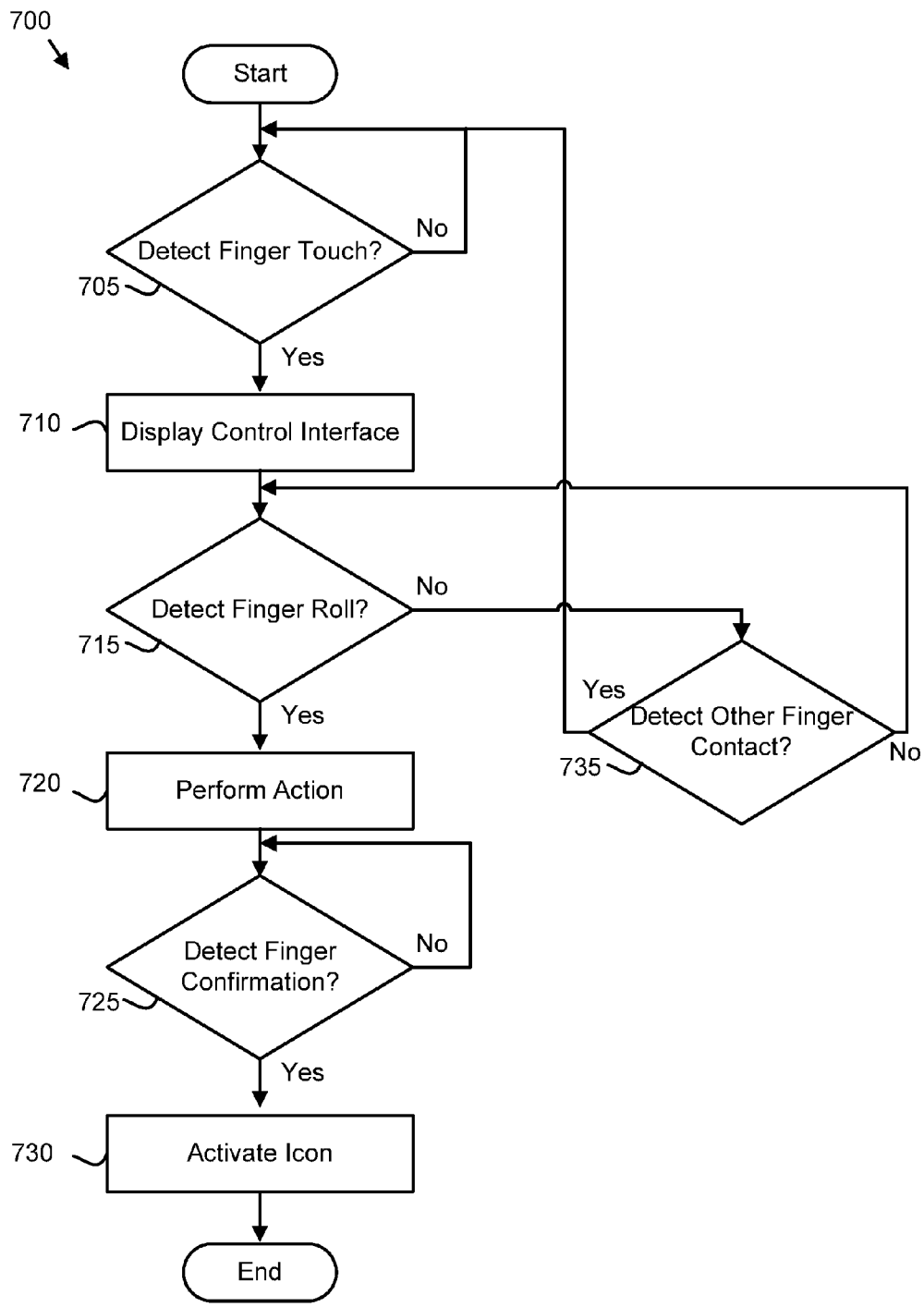
FIG. 7 is a schematic flow chart diagram illustrating one embodiment of a touchscreen virtual track control method.

FIG. 7 is a schematic flow chart diagram illustrating one embodiment of a touchscreen virtual track control method 700. The method 700 may perform the functions of the apparatus and system described in FIGS. 1-6. The method 700 may be performed by the processor 205. Alternatively, the method 700 may be performed by a storage device such as the memory 210 storing machine-readable code.

The method 700 starts, and in one embodiment, the detection module 225 may detect 705 a finger touch 315. If the detection module 225 does not detect 705 the finger touch 315, the detection module 225 may continue to wait for the finger touch 315.

If the detection module 225 detects 705 the finger touch 315, the display module 220 may display 710 a control interface. In one embodiment, the control interface is an enlarged window displaying a magnified portion of the touchscreen 110. Alternatively, the control interface may display icons 105 within a specified radius of the finger touch as enlarged icons with each enlarged icon disposed in a unique direction relative to a specified point of the control interface. The specified radius may be in the range of 0.75 to 2 cm.

The detection module 225 may detect 715 a finger roll 300 of the finger 305 on the touchscreen 110. The detection module 225 may detect 715 the finger roll 300 in response to the display 710 of the control interface. In one embodiment, the detection module 225 detects 715 the finger roll 300 from changes in the finger portions 310 of the finger 305 contacting the touchscreen 110.

If the detection module 225 does not detect 715 the finger roll 300, the detection module 225 may detect 735 other finger contact. For example, the detection module 225 may detect 735 a brief contact of the finger 305 that is not the finger touch 315. If the detection module 225 detects 735 other finger contact, the detection module 225 may loop to detect 705 another finger touch 315. The other finger contact may be any contact of the finger 305 with the touchscreen 110 that is not within an area of the control interface and/or that is not at the location of the finger touch 315. For example, if the user touches another area of the touchscreen 110 outside of the control interface and away from the location of the finger touch 315, the detection module 225 may remove the control interface from the touchscreen 110 and detect 705 another finger touch 315. If the detection module 225 does not detect 735 other finger contact, the detection module 225 may continue to detect 715 the finger roll 300.

If the detection module 225 detects 715 the finger roll 300, the detection module 225 may further perform 720 an action in response to detecting the finger roll 300. In one embodiment, the detection module 225 activates a first icon 105 in a first unique directions parallel to a direction 600 of the finger roll 300 as the action as will be illustrated hereafter. For example, the control interface may display four icons 105, each icon 105 disposed in a unique direction 600 from the center of the control interface. The detection module 225 may detect 715 the finger roll 300 and initiate the action of the icon 105 disposed in a direction relative to the center of the control interface that is most parallel to the unique direction 600 of the finger roll 300.

In an alternate embodiment, the detection module 225 may activate the icon 105 disposed in a direction relative to a specified point of the control interface that is most parallel to the unique direction 600 of the finger roll 300. For example, the specified point may be a center of a lower edge of the control interface, and the icon 105 in a direction from the selected point that is most parallel to the unique direction 600 of the finger roll 300 may be activated.

Alternatively, the action may move a cursor within the control interface in the direction 600 of the finger roll 300. For example, a first finger roll 300 in a first direction 600 may move the cursor in a parallel direction to the first direction 600 of the first finger roll 300 until first finger roll ends 300. A second finger roll 300 in a second direction 600 may then move the cursor in a direction parallel to the second direction 600 of the second finger roll 300 until the second finger roll 300 ends.

In one embodiment, the action may move the control interface on the touchscreen 110. The control interface may display different icons 105 as the control interface is moved about the touchscreen 110. For example, the finger roll 300 may move the control interface from magnifying a first set of icons 105 to magnifying a second set of icons 105.

In one embodiment, the detection module 225 detects 725 a finger confirmation. The finger confirmation may be a finger tap at the location of the finger touch 315. Alternatively, the finger confirmation may be a finger tap within the control interface. In one embodiment, a finger tap occurs when the finger 305 contacts the touchscreen 110 for less than the minimum time interval of the finger touch 315.

In an alternate embodiment, the method 700 may end without detecting 725 the finger confirmation. For example, if the finger roll 300 indicates a first icon 105, the first icon may be immediately activated.

In one embodiment, the detection module 225 activates 730 a selected icon in response to the finger confirmation and the method 700 ends. For example, the finger roll 300 may navigate the cursor to the first icon 105. A finger confirmation in the form of a finger tap may activate the first icon 105.

Figure 8:
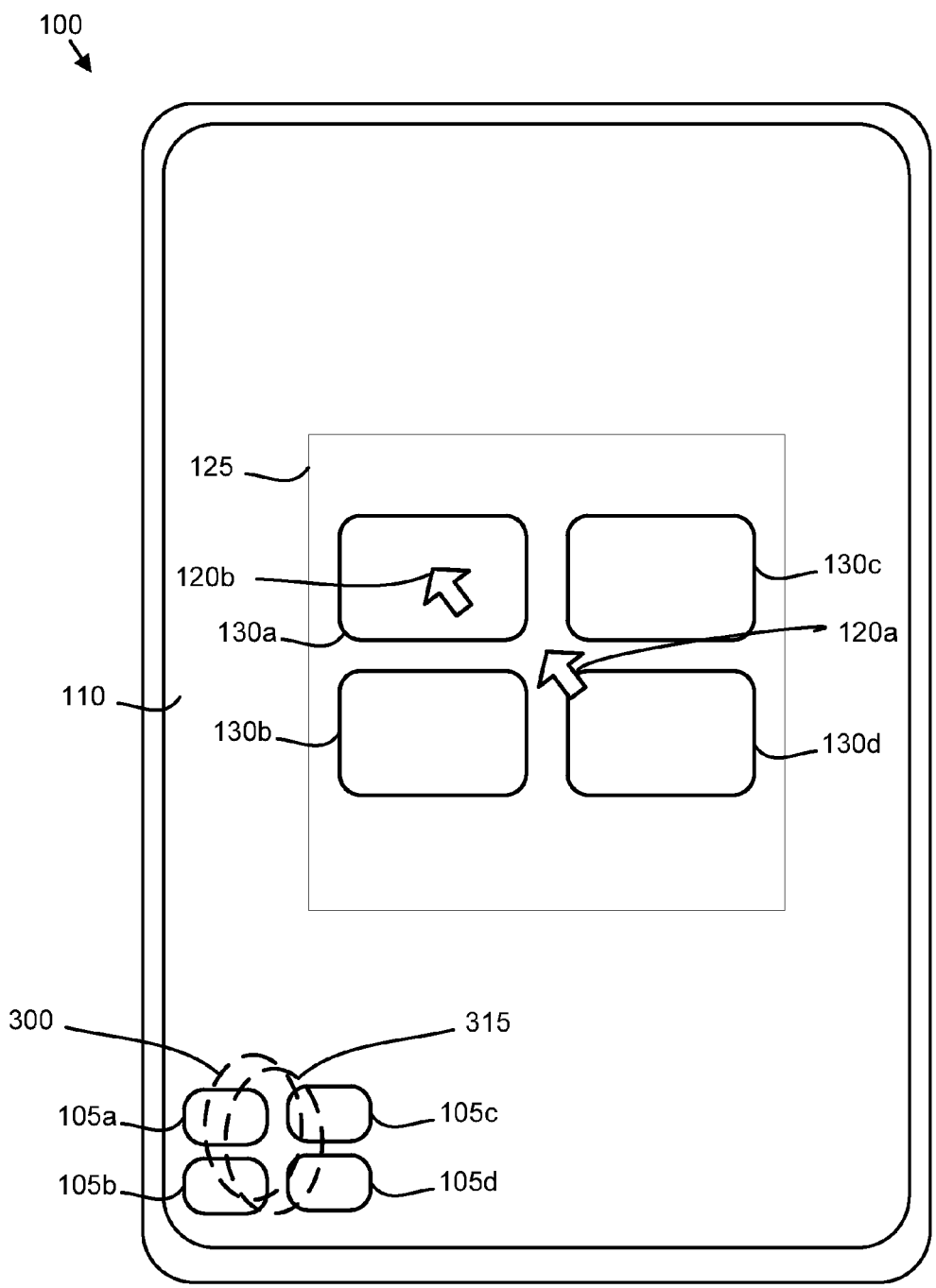
FIG. 8 is a front view drawing illustrating one embodiment of an electronic device with control interface.

FIG. 8 is a front view drawing illustrating one embodiment of an electronic device 100 with a control interface 125. The electronic device 100 is the electronic device 100 of FIG. 1.

In response to a finger touch 315 in the area of four icons 105, the display module 220 displays the control interface 125. The control interface 125 may be an enlarged window displaying a magnified portion of the touchscreen 110. In one embodiment, the detection module 225 positions the cursor 120a at the center of the control interface 125.

In the depicted embodiment, the finger roll 300 is shown as a shift in the finger portions 310 of the finger 305 that contact the touchscreen 110. The cursor 120 may move within the control interface 125 in response to the finger roll 300. In one embodiment, the cursor 120 moves in a direction that is parallel to the direction 600 of the finger roll 300.

In the depicted embodiment, the finger roll 300 may position the cursor 120 over the first enlarged icon 130a. The first enlarged icon 130a over which the cursor 120b may be activated by a finger confirmation. The finger confirmation may be a finger tap at the location of the finger roll 300. Alternatively, the finger confirmation may be a finger tap on the first enlarged icon 130a.

Figure 9:
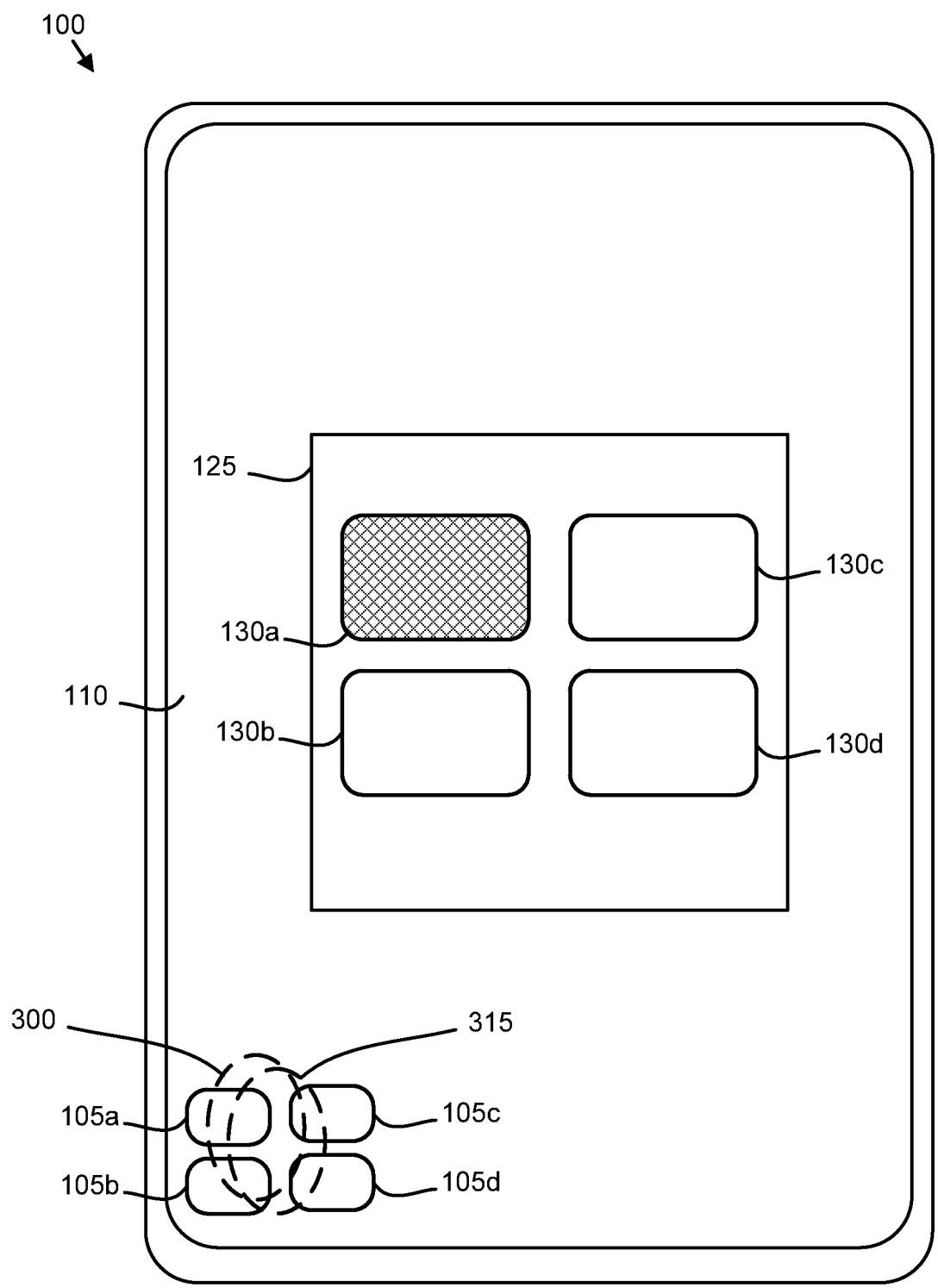
FIG. 9 is a front view drawing illustrating one alternate embodiment of an electronic device with control interface.

FIG. 9 is a front view drawing illustrating one alternate embodiment of an electronic device 100 with a control interface 125. The electronic device 100 is the electronic device 100 of FIG. 1.

In response to a finger touch 315 in the area of four icons 105, the display module 220 displays the control interface 125. In one embodiment, the control interface 125 displays icons 105 disposed within the specified radius of the finger touch 315 as enlarged icons 130. Each enlarged icon 130 may be disposed in a unique direction relative to the specified point of the control interface 125. In one embodiment, the specified point is the center of the control interface 125.

In the depicted embodiment, the finger roll 300 is shown as a shift in the portions 310 of the finger 305 that contact the touchscreen 110. In response to detecting the finger roll 300, the detection module 225 may activate the first enlarged icon 130a as the first enlarged icon 130a is in a unique direction parallel to the direction 600 of the finger roll 300.

In an alternate embodiment, the detection module 225 may select the first enlarged icon 130a as the first enlarged icon 130a is in a unique direction parallel to the direction 600 of the finger roll 300. The detection module 225 may further activate the first enlarged icon 130a in response to detecting a finger confirmation. The finger confirmation may be a finger tap at the location of the finger touch 315. Alternatively, the finger confirmation may be a finger tap on the first enlarged icon 130a.

Figure 10:
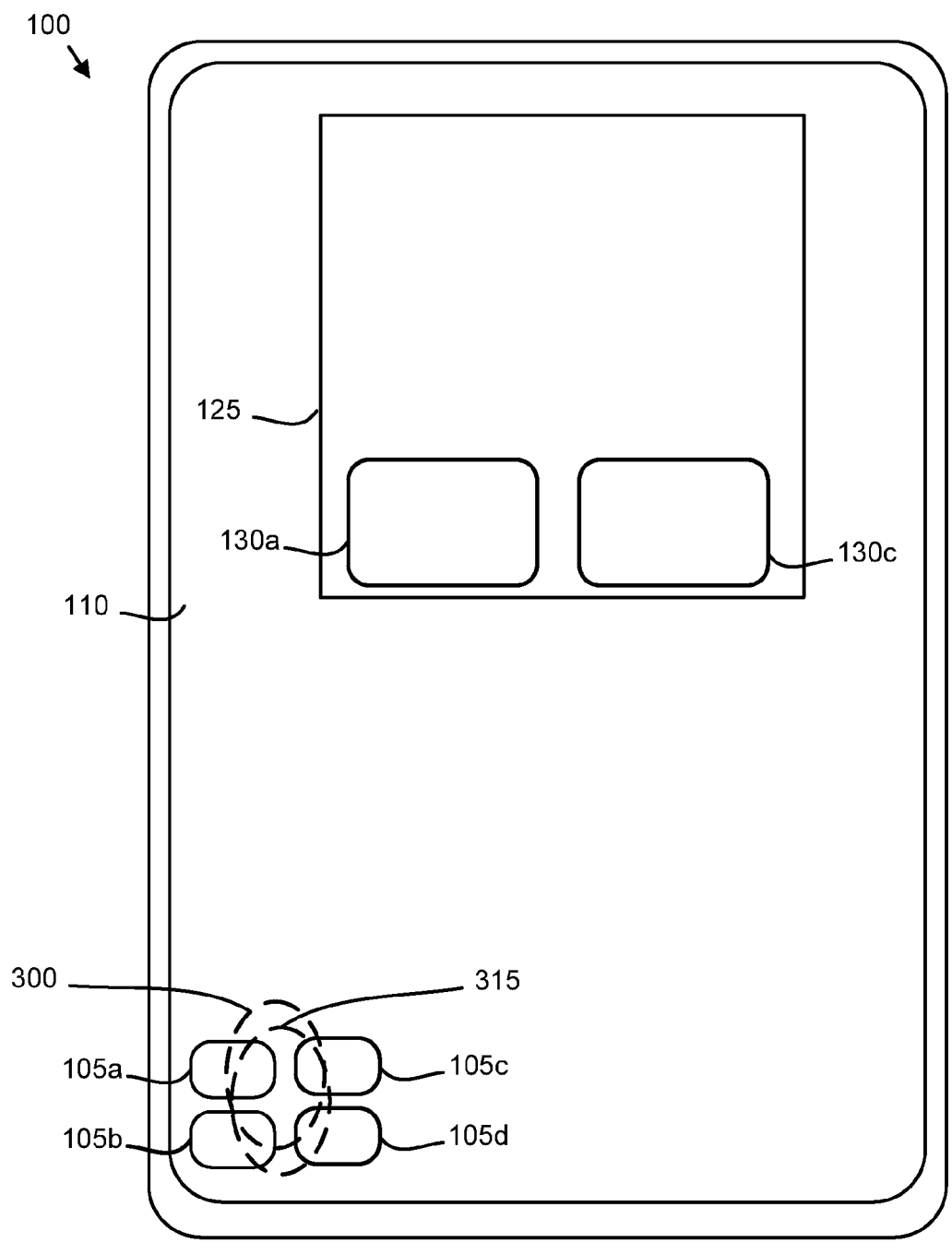
FIG. 10 is a front view drawing illustrating another alternate embodiment of an electronic device with control interface.

FIG. 10 is a front view drawing illustrating one alternate embodiment of an electronic device 100 with a control interface 125. The electronic device 100 of FIGS. 8 and 9 are shown. In response to a finger touch 315 in the area of four icons 105, the display module 220 displays the control interface 125. An upward finger roll 300 is also depicted. The control interface 125 is depicted as being moved upward on the touchscreen 110 in response to the upward finger roll 300. As a result, the control interface 125 displays a different portion of the touchscreen 110. In one embodiment, the detection module 225 may receive a finger confirmation within the control interface 125 to select an enlarged icon 130.

The embodiments display a control interface 125 in response to detecting a finger touch 315. The embodiments further detect a finger roll 300 of the finger 305 on the touchscreen 110 and perform an action in response to detecting the finger roll 300. The embodiments provide finer control for the selection an activation of icons 105 on the touchscreen 110. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a storage device storing machine-readable code;
a processor executing the machine-readable code, the machine-readable code comprising:
a display module that displays a control interface in response to detecting a finger touch of a finger on a touchscreen, wherein the control interface displays icons within a specified radius of the finger touch as enlarged icons with each icon disposed in a unique direction relative to a specified point of the control interface; and
a detention module that detects a finger roll of the finger on the touchscreen and activating a first icon in a direction relative to the specified point most parallel to a finger roll direction in response to detecting the finger roll.

2. The apparatus of claim 1, detecting the finger roll comprising detecting a first finger portion remaining in a first position relative to the touchscreen while a second finger portion changes relative to the touchscreen.

3. The apparatus of claim 1, detecting the finger touch comprising detecting touching and holding the finger on the touchscreen for a minimum time interval.

4. The apparatus of claim 1, wherein the control interface is an enlarged window displaying a magnified portion of the touchscreen.

5. The apparatus of claim 1, the detection module further detecting a finger confirmation by detecting a finger tap and activating a first icon in response to the finger confirmation.

6. The apparatus of claim 1, wherein the action activates a first icon in a first unique direction parallel to a direction of the finger roll.

7. A method for touchscreen virtual track control comprising:
displaying, by use of a processor a control interface in response to detecting a finger touch of a finger on a touchscreen, wherein the control interface displays icons within a specified radius of the finger touch as enlarged icons with each icon disposed in a unique direction relative to a specified point of the control interface;
detecting a finger roll of the finger on the touchscreen; and
activating a first icon in a direction relative to the specified point most parallel to a finger roll direction in response to detecting the finger roll.

8. The method of claim 7, detecting the finger roll comprising detecting a first finger portion remaining in a first position relative to the touchscreen while a second finger portion changes relative to the touchscreen.

9. The method of claim 7, detecting the finger touch comprising detecting touching and holding the finger on the touchscreen for a minimum time interval.

10. The method of claim 7, wherein the control interface is an enlarged window displaying a magnified portion of the touchscreen.

11. The method of claim 7, further comprising detecting a finger confirmation by detecting a finger tap and activating a first icon in response to the finger confirmation.

12. The method of claim 7, wherein the action selects a first icon in a first unique direction parallel to a direction of the finger roll.

13. A program product comprising a non-transitory storage device storing machine-readable code executed by a processor to perform the operations of:
displaying a control interface in response to detecting a finger touch of a finger on a touchscreen, wherein the control interface displays icons within a specified radius of the finger touch as enlarged icons with each icon disposed in a unique direction relative to a specified point of the control interface;
detecting a finger roll of the finger on the touchscreen; and
activating a first icon in a direction relative to the specified point most parallel to a finger roll direction in response to detecting the finger roll.

14. The program product of claim 13, detecting the finger roll comprising detecting a first finger portion remaining in a first position relative to the touchscreen while a second finger portion changes relative to the touchscreen.

15. The program product of claim 13, detecting the finger touch comprising detecting touching and holding the finger on the touchscreen for a minimum time interval.

16. The program product of claim 13, wherein the control interface is an enlarged window displaying a magnified portion of the touchscreen.

17. The program product of claim 13, the operations further comprising detecting a finger confirmation by detecting a finger tap and activating a first icon in response to detecting the finger confirmation.

18. The program product of claim 13, wherein the action selects a first icon in a first unique direction parallel to a direction of the finger roll.

* * * * *